United States Patent [19]

Brunner

[11] 4,301,837
[45] Nov. 24, 1981

[54] CONTROL VALVE

[75] Inventor: Rudolf Brunner, Baldham, Fed. Rep. of Germany

[73] Assignee: Heilmeier & Weinlein Fabrik für Oel-Hydraulik GmbH & Co., KG, Fed. Rep. of Germany

[21] Appl. No.: 128,281

[22] Filed: Mar. 7, 1980

[30] Foreign Application Priority Data

Mar. 14, 1979 [DE] Fed. Rep. of Germany ....... 2910029

[51] Int. Cl.³ .............................................. F15B 13/04
[52] U.S. Cl. ........................... 137/625.68; 137/596.13; 251/282
[58] Field of Search ..................... 137/596.13, 625.68; 251/282

[56] References Cited

U.S. PATENT DOCUMENTS 3,820,568 6/1974 Brunner et al. ............... 137/625.68

Primary Examiner—Gerald A. Michalsky
Attorney, Agent, or Firm—Kinzer, Plyer, Dorn & McEachran

[57] ABSTRACT

A control valve for a high pressure hydraulic system with a piston slide which can be moved from a neutral position into a first and, if desired, into a second control position, which makes it possible to effect a connection between a pump connection opening and at least one consumer device connection opening staggered relative thereto in a longitudinal direction with flow pockets on the circumference and throughflow channels between the flow pockets.

5 Claims, 5 Drawing Figures

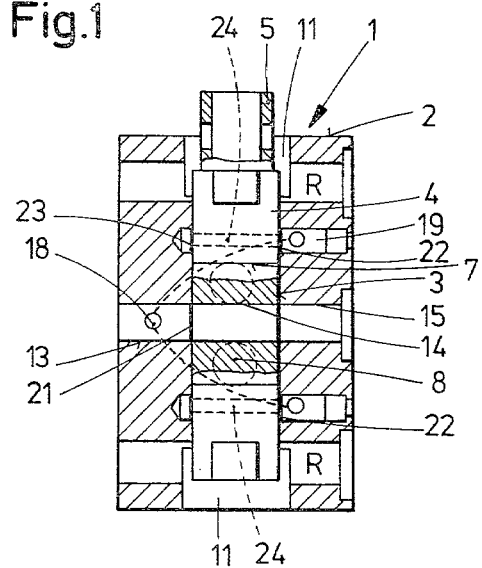
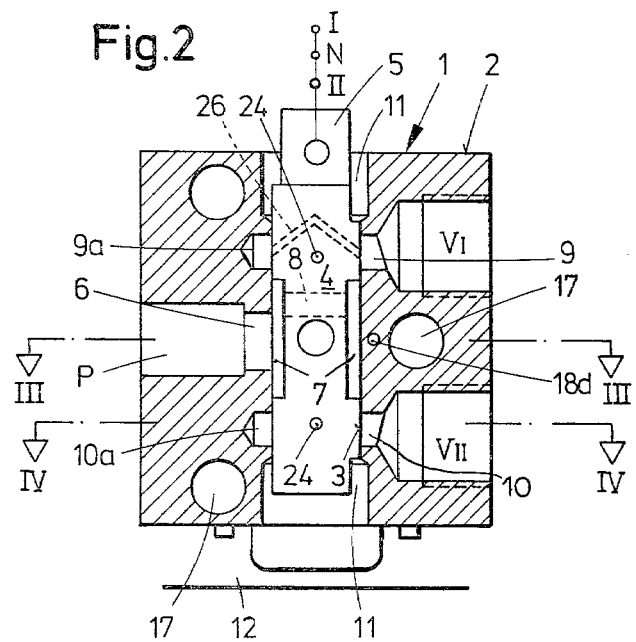

CONTROL VALVE

The invention relates to a control valve of the type mentioned in the preamble of the principal claim. From German Auslegeschrift No. 21 52 830, FIGS. 5 to 9, a control valve is known in which a pressure balance of the piston slide in its control positions is achieved in that the adduction channel branching off from the pump connection—relative to the longitudinal axis of the alide hole—in disposed eccentrically and is in alignment with a through-hole, which is also eccentric, in the piston slide, when the latter is in neutral position. At the same time, the channel which leads the working pressure from the pump connection opening to the pocket in the piston slide is extended and is led, avoiding the piston slide, to the side of the piston slide situated opposite the adduction channel. This channel also meets the slide hole eccentrically and is in alignment with a further eccentric through hole of the piston slide when the latter is in the neutral position. The by-passing channel is then extended in the housing and again rerouted before it opens out into the return flow channel system. With the aid of the transversal holes which run parallel with each other along an axial plane of the piston slide, and through which the fluid passes in opposite directions in the neutral position, a pressure balance is aimed at in the control positions. In fact, as soon as the piston slide is moved into a control position, the two eccentric transversal holes are moved facing the channel ports and shut off. The pressure medium with the oerating pressure for the consumer device is then in the two channel branches on both sides of the piston slide. The lever arm available as a result of the eccentric position of the transversal holes in the piston slide, between the pressure inpact areas from the two channel branches, leads to a rotating load for the piston slide which, particularly in the high pressure hydraulic system, reduces its easy adjustability. It has been found in practice that at high working pressures through the lever arm, present between the pressure forces acting in the two pressure impact areas on both sides of the piston slide, an improvement relative to non-pressure-balanced piston slides is in fact achieved, but said improvement does not lead to any perfect pressure balance. The torque produced on the piston slide by the two pressure forces with their lever arm always leads to a local pressing onto the wall of the slide hole, or to a high loading of the mechanism which is responsible for the movement of the piston slide and also for its locking in rotation in the slide hole.

A further drawback arises from the fact, as is particularly shown in FIG. 6, that for the pressure-less passage along one and the same axial plane of the piston slide two eccentric holes are required through which fluid passes in contercurrent in the neutral position. This means that in the cross-section of the piston slide which is, anyway, clearly reduced by the flow pockets, it is necessary to have two holes, which are also separated by an adequate thickness of material, the passage cross-section of which holes being naturally restricted considerably upwards as a result. The result of this is an also considerably restricted passage volume in the position for the pressure-less throughflow. However, a high passage performance in the pressure-less throughflow is desirable and particularly when a number of such valves are disposed in a row one behind the other, in which arrangement a through flow is provided for supplying working pressure to each individual control valve along the line, along which path the last control valve in the row should still be provided with an adequately great throughflow of pressure medium.

The object of the invention is to improve a control valve of the type first defined above so that, in the position for the pressure-released throughflow it allows a large throughput and that a complete pressure balance is made possible for the piston slide in its control positions and also the transitional areas.

According to the invention the problem set is solved by the features indicated in the characterising portion of claim 1.

Because—as with the control valve according to German Auslegeschrift No. 21 52 830—two necessary throughflow holes for pressure-released throughput are not required along the same axial plane of the piston slide, but only one is needed, this can be formed with a great cross-section. Correspondingly high is also the throughput in pressure-released circulation. It has been found that with a diameter of only 10 mm for the throughflow hole it is possible to achieve a throughput of up to 200 liters/min. and more. However, at the same time, by means of the recesses which are disposed symmetrically on both sides of the adduction channel a fully satisfactory and complete pressure balance on the piston slide is achieved in the control position or positions. As a result of the face that the piston slide itself effects through its control movement the connection between the recesses which lie opposite each other in each instance, when it is switched into the position for pressure-released throughflow, pressure balance is also then maintained. As the adduction channel and the recesses are staggered at an angle relative to the plane of the consumer device connections and the pump inflow opening, the recesses may be provided relatively close on both sides of the adduction channel, as a result of which there is produced a negligible bending load of the piston slide.

There is indeed known from German Auslegeschrift No. 12 03 068 a slide for a control valve which is actuatable both for rotating and alternating motion. The individual connections in the housing, supplying the pressure medium, are all arranged on a circumferential side of the slide. In each case, diametrically opposite, there are recesses which, via curved through flow holes in the slide, are charged with the relevant impacting pressure, in order to produce in this way a pressure balance. These through holes in the slide must be provided in it in each position of the piston slide along its plane corresponding to the axial displacement, which means a high expenditure of labour and in addition a definite weakening of the slide. Furthermore there is the drawback that the recesses on the twisting or displacement of the slide are closed off under pressure, so that pressure medium remains in the recesses, which then exerts a reactive force on the slide. In addition, not all the connections opening out into the slide hole are impacted by pressure simultaneously, but their impacting can vary, as a result of which control positions arise in which no full equalisation of pressure at the slide takes place, but reactive forces which press the slide against the wall of the slide hole. Apart from this, the construction of this known control valve is in a fundamentally different manner.

In the work "Oelhydraulik", 1963, page 207, issued by Springer-Verlag Publishers, Vienna, a recommendation is given to effect a pressure balance in a control valve by means of a symmetrical conformation of the piston slide both in radial and in axial direction. It is stated furthermore that with long slides provision must be made for a pressure balance which arises as a result of the frequent variation of size of the pressure impact surfaces on the front sides. These indications to disclose that the problem of pressure balance on the piston slide of control valves plays a considerable part, but do not indicate how this problem is to be solved simply and suitably in practice.

An embodiment of a control valve according to the invention which can be produced simply and economically is given in claim 2. The blind hole is appropriately disposed staggered laterally on the adduction channel so that is does not increase the housing length along the longitudinal direction of the hole.

A further appropriate embodiment of a control valve with two alternatively impactable consumer device connection openings on both sides of the pump connection opening is given in claim 3. As a result of this simple construction two symmetrically impinging counter-forces oppose the pressure force that is exerted by the pressure medium in the adduction channel on the piston slide in its control positions. These two counter-forces add up to a perfect pressure balance and thereby to an easy adjustability of the piston slide. As the two blind holes require only half the diameter of the adduction channel, they do not lead to any increase of the control valve housing in the longitudinal direction of the hole.

An appropriate embodiment of the control valve according to the invention is further given in claim 4. Drilled branch channels can be produced simply and economically and can be sealed off particularly reliably. When the control valve housing is made as a casting, the connection channel can be cast at the same time by means of inserted cores.

A further improved equalisation of pressure for the piston slide is provided in an embodiment such as may be found in claim 5. Here, the pressure prevailing in the neutral position of the piston slide is also balanced in the consumer device connection opening at the piston slide.

An embodiment of the subject of the invention is described in greater detail below on the basis of the drawing, in which:

FIG. 1 is a vertical section through a control valve,

FIG. 2 is a vertical section through the control valve rotated by 90° relative to FIG. 1.

Figure 3:
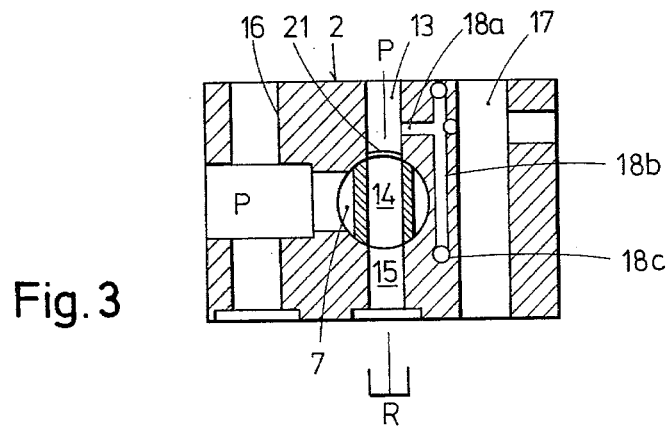
FIG. 3 is a horizontal section along a line III—III of FIG. 2.
Figure 4:
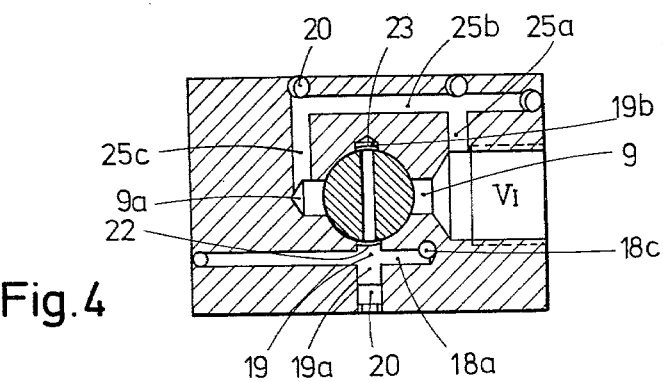
FIG. 4 is a further horizontal section along a line IV—IV in FIG. 2.

A control valve 1 according to FIGS. 1 to 4 has a rectangular housing 2 which in the longitudinal direction has a slide hole 3 going through it, in which hole a piston slide 4 can be moved by means of a slide rod 5 from a neutral position N into two control positions I and II (FIG. 2). From a pump connection P a pump connection opening 6 leads to the slide hole 3. In the piston slide 4 two pockets 7 are formed, lying diametrically opposite each other and extending in a longitudinal direction; they are in flow connection through the connecting holes 8 extending through the piston slide. One of the pockets 7 is situated in each position of the piston slide (neutral position N, control position I and control position II) before the pump connection opening 6. On the side of the slide hole 3 facing the pump connection opening 6 consumer device connection openings 9 and 10, staggered in a longitudinal direction, are disposed, from which there are connections to the consumer devices $V_I$ and $V_{II}$. Recesses 9a and 10a, facing the consumer device connection openings 9 and 10 (FIG. 2), and open towards the slide hole 3 are provided in the housing 2. Staggered laterally relative to the consumer device connection openings 9 and 10 (FIG. 2, FIG. 1) there are return flow connections 11, which are overridden by the piston slide 4, and which lead to return flow channels 5. The slide hole 3 is closed at both ends by cover plates 12.

Perpendicularly to the housing level, along which the pump connection opening 6 and the consumer device connection openings 9 and 10 lie, an adduction channel 13 passes through the housing 2; in the neutral position of the piston slide it is in alignment with a radial hole 14 which extends right through between the holes 8 in the piston slide 4, and is led further in a return flow channel 15. The adduction channel 13 is connected via a transversal connection not represented with the pump connection P. The adduction channel 13 forms with the radial hole 14 and the return channel 15 the so-called pressure-released throughflow of the control valve 1. Parallel with the pressure-released throughflow 13, 14, 15, the housing 2 has also passing through it a pump channel 16 which crosses the pump connection P. Furthermore, fixing holes 17 are provided which also pass through the housing 2 over the whole width. The return flow channels R which pass through the housing over the entire width, the pressure-released throughflow 13, 14, 15, the pump channel 16 and the fixing holes 17 are particularly needed when several of these control valves are placed one against the other with their side surfaces in a row, and are screwed in seal-tight manner. Then these holes are in alignment, so that through the entire row of control valves the necessary passage is provided for the pressure medium, a pump connection needing to be provided only at the first control valve of the row. On the free side of the last control valve, on the other hand, collector ducts are connected for the return flow channels and the pressure-released throughflow.

From the adduction channel 13 of control valve 1 a by-pass channel 18, which consists of individual branch channels 18a to 18d which may be seen on FIG. 1, leads in each case to a recess 19a staggered laterally relative to the adduction channel 13 and lying diametrically opposite to this relative to the slide hole. The recess 19a is open towards the slide hole. Diametrically opposite there is provided in each case a further recess 19b in the housing, which recess is also open towards the slide hole 3. A flow connection between the recesses 19a and 19b is established in the neutral position N of the piston slide via a radial hole 24 in the piston slide 4. The recesses 19a and 19b are the two ends of a blind hole 19 which crosses the slide hole 3, which blind hole is again closed at its opening by a plug or a pressed-in ball 20.

The adduction channel 13 opens out into the slide hole with a cross-area 21 (FIG. 1) while the recesses 19a, 19b have the cross-areas denoted by 22 and 23, the latter recesses facing the slide hole.

From each consumer device $V_I$, $V_{II}$ or the consumer device connection openings 9, 10, a channel 25a to 25c which by-passes the slide hole leads to a blind hole 9a, 10a situated diametrically facing, the cross-areas of which are equal to the cross-areas of the consumer device connection openings 9 and 10. Via the by-pass channel 25a to 25c the piston slide, in neutral position N, is impinged by the pressure prevailing in the consumer device connection on two diametrically-opposite circumferential areas, the pressures cancelling themselves as a result of their opposite directions and the piston slide being accordingly pressure-balanced in this area also.

Figure 5:
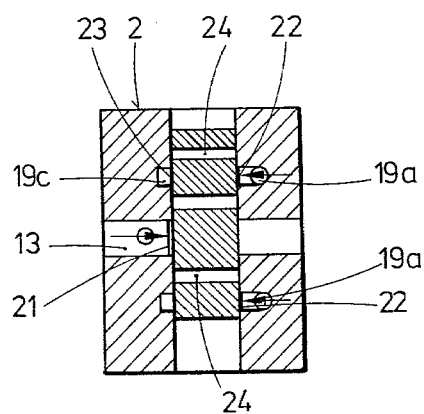
FIG. 5 is a vertical section according to FIG. 1 in a control position of the piston slide.

FIG. 5, shows the piston slide 4 in the above-described control valve in its control position II, i.e. moved out of the neutral position so far upwards that, via the the pockets 7 the pressure medium passes from the pump connection P to the consumer device connection $V_I$, while the pressure medium can flow from the consumer device $V_{II}$ into the lower rear flow channel R. In this position the pressure-released throughflow is interrupted, as the radial hole 14 is pushed so far that the outline of the piston slide closes off the adduction channel 13. The pressure medium is then present in cross-section 21 at the piston slide and exerts on this a pressure force in the direction of an arrow. At the same time, however, the same pressure acts via the by-pass channel 18 in the two recesses 19a and their cross-sections 22 in the opposite direction. The sum of the cross-sections 22 thereby corresponds to the cross-section 21 so that the piston slide is pressure-balanced. Seeing also that the radial holes 24 are moved upwards and are no longer in alignment with the blind holes 19, the recesses 19b are pressure-released so that from this side no additional loading is exerted on the piston slide.

Naturally, to simplify the construction, the by-pass channel 18, instead of having the branch channels which extend only from the housing lateral surfaces, could also comprise branch channels which, starting from two housing corners would lead slantingly into the housing and dispense with having branch channels along one housing plane.

The principal advantage of the described control valve construction lies in the large cross-sectional pressure-released throughflow which permits a high throughput volume of pressure medium, as the radial hole through the slide can be constructed with as great a diameter as is desirable. A high throughput volume on pressure-released throughflow leads in the control positions of the piston slide to a high working pressure for the consumer device or to a high throughput for the consumer devices. At the same time a pressure balance prevails in each position of the piston slide, so that the latter can be adjusted easily and with fine sensitivity.

I claim:

1. A control valve for a pressure medium system, particularly a high pressure hydraulic system, with a housing through which a slide hole passes and a piston slide which can be moved from a neutral position into a first, and if desired, a second control position, and which is pressure-balanced in all positions, with a pump connection opening to the slide hole and at least a consumer device connection opening staggered in the longitudinal direction of the hole relative to the pump connection opening, with a return flow connection opening associated with the consumer device connection opening, with a pocket for guiding the flow at the piston slide extending in the longitudinal direction in the area of the pump connection opening, which, in the first control position connects the consumer connection opening with the pump connection opening, while the control slide in the second control position connects the consumer device control opening with the return flow connection opening, and with a pressure-released circulation in the neutral position of the piston slide which flows via an adduction channel branched off from the pump connection, a radial hole in the piston slide in alignment with this, and a return flow channel in alignment with the adduction channel, characterised in that two first recesses (19a) are provided, open towards the slide hole (3), which—relative to the slide hole (3)—are situated diametrically opposite the opening of the adduction channel (13), though staggered symmetrically laterally relative to it and are permanently connected with the adduction channel (13) via connection channels (18a–d) which by-pass the slide hole (3) in the housing, in that opposite each first recess (19a) there lies a second recess (19b), also open towards the slide hole, and connected in the neutral position of the piston slide via a radial hole (24) in the piston slide with the first recess (19a), and in that the cross-sectional area (22; 23) of each recess (19a, b) corresponds to half the cross-sectional area (21) of the opening of the adduction channel.

2. A control valve according to claim 1, characterised in that the recesses (19a, 19b) are formed from the two ends of a blind hole (19) which crosses the slide hole in the housing (2).

3. A control valve with two alternatingly impingeable consumer device connection openings on both sides of the pump connection opening, according to one of claims 1 or 2, characterised in that, substantially along the radial plane of each consumer device connection opening (9, 10)—though angularly staggered relative thereto—provision is made in each case for a blind hole (19) and a radial hole (24) passing through the piston slide.

4. A control valve according to one of claims 1 or 2, characterised in that the connection channel (18) is formed from several connected branch channels (18a–d) drilled from the external sides of the housing, the hole inlets of which situated on the external sides of the housing are closed by pressed-in balls or plugs (20).

5. A control valve according to one of claims 1 or 2, characterised in that on the side of the slide hole (3) which is situated diametrically opposite the consumer device connection opening a recess (9a, 9c) open towards the slide hole is disposed, having a cross-section identical with the cross-section of the consumer device connection opening, said recess being connected via a by-pass channel (25) led around the slide hole with the consumer device connection opening (9, 10).

* * * * *